United States Patent
Perry et al.

[15] 3,673,429
[45] June 27, 1972

[54] PSEUDO-AND GATE HAVING FAILSAFE QUALITIES

[72] Inventors: Robert H. Perry, Monroeville; Thomas C. Matty, Belle Vernon, both of Pa.

[73] Assignee: Westinghouse Electric Corporation, Pittsburgh, Pa.

[22] Filed: Oct. 19, 1970

[21] Appl. No.: 82,101

Related U.S. Application Data

[63] Continuation of Ser. No. 789,536, Jan. 7, 1969, abandoned.

[52] U.S. Cl. ..........................307/218, 246/187 R, 307/225, 328/39, 328/94, 328/110, 328/140
[51] Int. Cl. .......................................................H03k 19/22
[58] Field of Search..................307/218, 225, 220, 247, 233, 307/271; 328/39, 94, 110, 140; 246/DIG. 3, 187

[56] References Cited

UNITED STATES PATENTS

| | | | |
|---|---|---|---|
| 3,421,018 | 1/1969 | Martin | 328/94 X |
| 3,491,302 | 1/1970 | Madsen et al. | 307/218 X |
| 3,508,078 | 4/1970 | Yasuo Komamiya et al. | 307/218 X |
| 2,994,790 | 8/1961 | Delaney | 307/225 |
| 3,041,448 | 6/1962 | Pascoe et al. | 246/187 X |
| 3,072,785 | 1/1963 | Hailes | 246/187 X |
| 3,096,056 | 7/1963 | Allison | 246/187 |
| 2,513,342 | 7/1950 | Marshall | 246/DIG. 3 |
| 3,421,018 | 1/1969 | Martin | 328/94 X |
| 3,491,302 | 1/1970 | Madsen et al. | 307/218 X |
| 3,508,078 | 4/1970 | Yasuo Komamiya | 307/218 X |

*Primary Examiner*—Stanley T. Krawczewicz
*Attorney*—F. H. Henson, R. G. Brodahl and Michael Oglo

[57] ABSTRACT

There is disclosed a circuit for performing an AND gate function using two-state D.C. switching logic as the gate inputs, including a sequence of flip-flop stages connected as a pulse frequency dividing network. Each flip-flop stage of the network is individually actuated into its operative role in the divider network by application of one of the logic signal inputs thereto as the stage operating potential. Simultaneous presence of TRUE logic conditions are sensed by application of a pulsing signal of predetermined frequency to the input of the dividing network and detection of the divided frequency at its output. Failure of any component or combination of components of this circuitry produces a no-output condition which is deemed failure in a failsafe manner.

9 Claims, 4 Drawing Figures

PATENTED JUN 27 1972 3,673,429
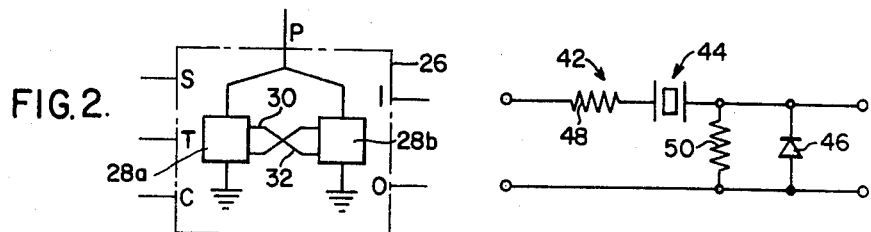
FIG. 2.
FIG. 3.
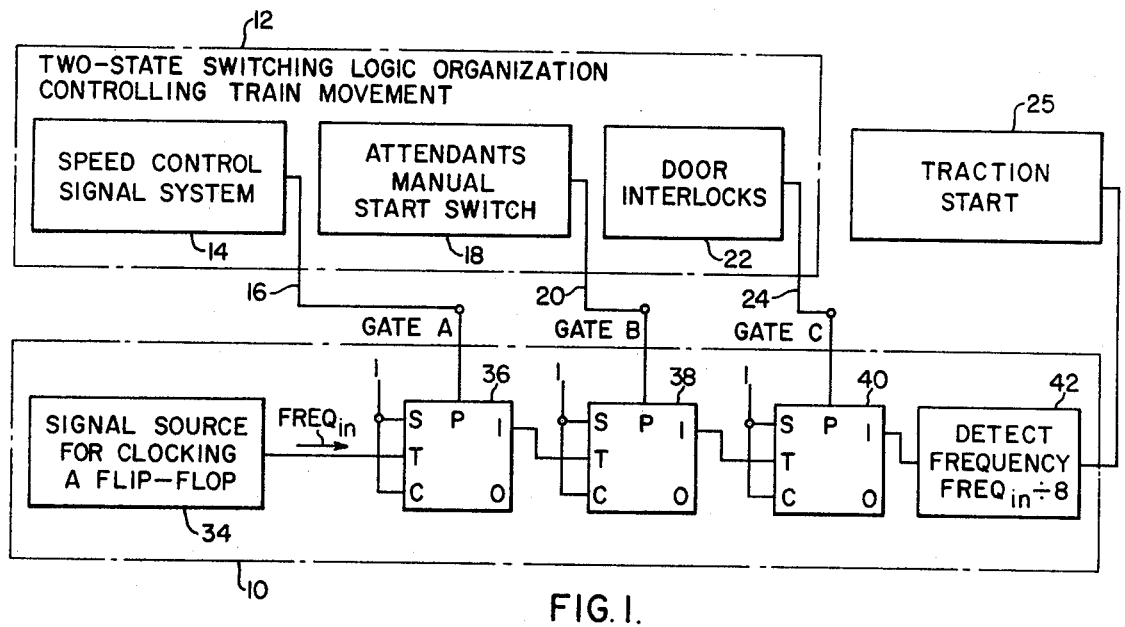
FIG. 1.
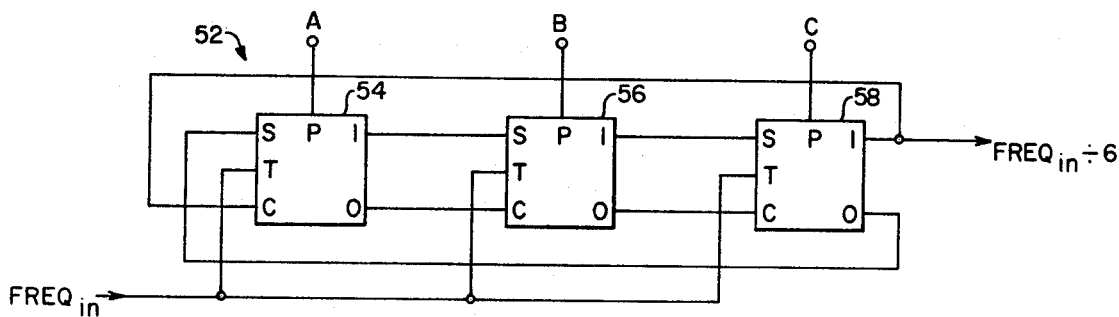
FIG. 4.
WITNESSES
Theodore F. Wrobel
James T. Young
INVENTORS
Robert H. Perry
and Thomas C. Matty
BY Michael F. Oglo
ATTORNEY

PSEUDO-AND GATE HAVING FAILSAFE QUALITIES

CROSS REFERENCE TO RELATED CASES

This is a continuation of Ser. No. 789,536 filed Jan. 7, 1969, now abandoned.

BACKGROUND OF THE INVENTION

The term "vital function" denotes a function to be performed by apparatus wherein incorrect operation could have catastrophic effects. An example of this is the control of train movement in an automated rapid transit system. An incorrect operation of the system allowing the train to start from a station when the track ahead is not clear, or allowing the train to start from the station before passengers are clear of the train door would obviously have a catastrophic effect.

The term "failsafe" denotes the quality of a device (including electronic circuitry) which performs a vital function. A device is failsafe if failure of any component thereof or combination of components result in a safe system condition, or "- safe failure mode".

The engineering technique for implementing "failsafeness" is to choose the components and arrangement of components of a device to yield a predetermined output condition regardless of how the device fails. Commonly, the predetermined output condition is the presence of no signal at all. The organization in which the device is a part, is then adapted to go into a "safe failure mode" of operation when this condition is present at the output of the device. For example, in automated rapid transit system the presence of no output signal from a failsafe device could cause all the trains whose safety are involved to come to a halt. In summary, failsafe design of a device provides a predetermined output condition regardless of how it may fail, including failure of components, failure of combinations of components, exposure to extreme elements, damage in collision, or vandalism. The remainder of the system is then adapted to yield a safe failure mode in response to this predetermined condition.

This invention relates to all-electronic circuitry for providing AND gate functions in connection with two-state D.C. logic decision networks, and more particularly to such circuitry which is of special utility as a component of a vital system requiring a failsafe quality.

Certain proposals are under consideration for the introduction of a large degree of automation into the field of railway urban rapid transit. Under many of these proposals, the movement of all the trains in the system would be predominantly under automation control (subject to minor monitoring by a "train attendant"). Many of the technical problems connected with such automation arise from the need that it be achieved consistent with the high traditional standards of safety of the passenger railway industry.

Introduction of this degree of automation into rapid transit systems would result in a manifold increase in switch-logic throughout the train equipment, wayside station equipment, and central control station equipment. To achieve the necessary high standards of safety, the switching logic systems must be made failsafe, and therefore employ failsafe components.

One of the basic building blocks of switching logic systems is the AND gate. It functions to detect simultaneous presence of a TRUE signal state at two or more inputs. The prior art AND gates, which are used in general applications, are typically constructed of switching transistors and resistance networks for coupling D.C. levels thereto. The quality of failsafeness is notoriously absent from these circuits. The various failure conditions which can happen to these circuits, including resistors opening, electric leads becoming unconnected, transistors failing, etc. sometimes yield a TRUE output state and sometimes yield an UNTRUE output state. This is inherent to the nature of semiconductor switches and the coupling of D.C. signals thereto. Attempts have been made to make transistor AND gates failsafe. These have included the so-called "redundancy" approach where redundant circuitry is provided to safeguard against any failure. This approach relies on the low probability of a combination of failures affecting all the redundant circuitry. Another approach is the so-called "preferred failure mode" scheme. Here reliance is placed upon the circuit components failing in their most likely manner. For example, reliance is placed upon a resistor becoming "opened" and not short circuited. The circuit is then synthesized such that opening of any of its resistors yields a predetermined output condition. This is done for every component within the circuitry. Although these approaches have met acceptance in the aerospace industry, they have been deemed inadequate for rapid transit system automation requirements. As a component of a railway system, a device can be exposed to an extremely long service life, direct exposure to the elements, possibility of vandalism, and the possibility of collision impact while in the energized condition. Because of the manifold character of these hazards, it is deemed that what is needed is truely failsafe circuit constructions. This is to say, a circuit construction is needed wherein any type of failure of any component or combinations thereof provides a safe failure condition.

Lacking a suitable failsafe AND gate circuit, the railway industry has resorted to implementing AND gate functions by use of the traditional railway relay device, which is an electromechanical construction. Briefly, the vital relay employs a very heavy relay armature and is so arranged that gravity will cause its contacts to open under any failure condition. In implementing an AND gate function, two or more of these relays are cascaded as a sequence of cascaded transfer relays. The disadvantages of this scheme include: limited switching speed (electromechanical construction); the bulkiness, particularly where two or more are cascaded; and their power requirements as electromechanical constructions.

SUMMARY OF THE INVENTION

A source providing a periodic flip-flop clocking signal is connected to the input of a flip-flop pulse dividing network of at least two flip-flop states. The source signal has a predetermined frequency. Each of the individual flip-flop stages of the dividing network are energized by an individual D.C. two-state logic signal when in its TRUE condition. Thus the dividing network is operative only upon simultaneous presence of the TRUE state signals at the individual flip-flop power inputs. The output of the dividing network is fed to a frequency selective filter which may be a crystal or other device having similar failsafe qualities, and then into a rectifier which is passive and unable to fail in a HIGH mode. The output from the rectifier is the gate circuit output.

The objectives of the present invention include provision of:

1. An electronic circuit for performing an AND gate function in connection with D.C. two-state logic signals which is of such construction and arrangement it allows virtually any failure condition of its individual components or combinations to result in failure in a safe manner.

2. A circuit in accordance with the preceding objective which is constructed of commonly available transistor modules and utilizes signal sources which are typically available in digital logic switching systems.

3. An all electronic substitute for a railway vital relay device in the implementation of cascaded transfer relay requirements, which substitute has higher switching speed, is compact, and has low energizing power requirements.

BRIEF DESCRIPTION OF THE DRAWINGS

FIG. 1 is a block diagram of the invention in connection with a logic organization for controlling train movement;

FIG. 2 is a diagrammatic illustration, illustrating certain features of the flip-flop structure used in the invention;

FIG. 3 is an electrical schematic of a detail of FIG. 1; and

FIG. 4 illustrates an alternative form of construction of a flip-flop frequency dividing network.

DESCRIPTION OF PREFERRED EMBODIMENTS

Referring now to the drawing and in particular to FIG. 1, the subject of the invention is a psuedo-AND gate circuit 10 having the quality of failing in a failsafe manner. For illustrating the invention, there is shown a simplified switching logic organization 12 involved in controlling the starting of a train at a passenger station in proposed automated rapid transit systems. Logic organization 12 includes a speed control signal system 14. The primary purpose of system 14 is to provide a command signal calling for the train to travel at a particular speed. The intelligence for this system comes from a control center or from a local start-stop equipment which is under the control of the center. For purposes of the present invention there is no need to go into the speed codes. What is relevant is that there is one output lead 16, which presents a 6 volt D.C. signal for all conditions in which the train is to travel at some forward speed, and which presents a zero volt output when the train is to remain stopped. The 6 volt D.C. level is hereinafter designated the "TRUE" or "ONE" logic state. The 0 volt level is designated the "UNTRUE" or "ZERO" state. A train attendant's manual switch 18 is also provided in organization 12. The train attendant actuates this switch when he is sure that the train doors are clear and desires the train to depart from the passenger station under automatic control. Actuation of the switch provides a 6 volt TRUE signal at output lead 20. The logic organization also includes a door interlock system 22 for insuring that all the train doors are securely latched before a train departs. Latched condition of the doors causes another 6 volt TRUE signal at the output line 24 thereof. As will be apparent as the description proceeds, psuedo-AND gate 10 is responsive to simultaneous presence of TRUE signals at lines 16, 20 and 24. When all are present, it will produce an output signal which actuates the train traction start equipment 25.

Referring now to FIG. 2, there is shown a diagrammatic illustration of a flip-flop 26 illustrative of the type of flip-flop that is used in the apparatus later described herein. It contains two switching transistor elements 28a and 28b, which are interconnected by cross-coupled regenerative feedback channels 30 and 32. In accordance with the present invention, feedback channels 30 and 32 are of the so-called "master-slave" type wherein coupling is by a direct D.C. signal and not through capacitance devices. Flip-flop 26 has five signal connection leads conventionally designated the set high input S, the clock or toggle input T, the set complement input C, the regular output I and the output complement O. If input S is raised to the ONE level and a clock pulse applied to T, the output will assume the ONE state. If input C is raised to the ONE level and the clock pulse applied to T then the output will assume the opposite or ZERO state. If both S and C are raised to the ONE level and clock pulses applied to T, the flip-flop will change state with an output frequency one-half that applied to T. Another feature of each flip-flop stage, in accordance with the present invention, is that the operating potentials required for the switching transistor devices 28a and 28b are equal to the TRUE level of logic organization 12, and each flip-flop stage has an individual input terminal P to receive the operating potential for its switching transistors.

Failsafe psuedo-AND gate 10, FIG. 1, is of the type employing a binary counter configuration of flip-flops. Gate circuit 10 comprises a periodic pulse source 34. Following the pulse source are first, second, and third flip-flop stages 36, 38 and 40 which are like the earlier described flip-flop stage 26. A failsafe frequency selective circuit 42 is connected to the output of flip-flop 40.

Periodic pulse source 34 is any suitable source which provides a periodic signal which is substantially higher in frequency than the fastest logic switching rate presented by logic organization 12 and which can actuate the first flip-flop 36. Typically, it may be a sine wave signal derived from the crystal control oscillator in a nearby clock signal waveshaping channel. The signal has a predetermined frequency, $FREQ_{in}$, and is fed to the T input of the flip-flop stage 36. The S and C inputs of all three flip-flop stages are connected to the ONE level. Power is supplied to stage 36 through terminal A to which lead 16 is connected. When speed control signal system 14 provides a ONE output, stage 36 is operative and the frequency $FREQ_{in}$ will be divided by two. This output is fed to the T input of stage 38 which is similarly connected and divides by a further factor of two giving an input frequency divided by four. This output is only present if a ONE logic state is provided to the B terminal of the second flip-flop. The output from the second flip-flop is supplied in turn to the third flip-flop stage 40 connected in a similar way to the previous two. The output of this flip-flop will be $FREQ_{in}$ divided by eight only if inputs A, B, and C are supplied with TRUE signals. The output from the final flip-flop in the counter is fed to the failsafe circuit 42 for detecting $FREQ_{in}$ divided by eight.

FIG. 3 illustrates the detailed construction of circuit 42 as comprising a crystal filter 44 followed by a rectifier 46, such as a semiconductor diode. A current limiting resistor 48 is ahead of the crystal, and a load resistor 50 appears across the diode. The circuit is similar to a half-wave rectifier. This circuit provides a D.C. level output if all the previous conditions are satisfied and the output frequency is present.

It can be shown that the failure of any component or combination of components of gate 10 will cause the output of the filter to fall to zero, which is the predetermined failure mode. Basically, this is because any failure within a master-slave type flip-flop stage results in it being unable to change state, which in turn prevents propagation of the pulses through the stage of the divider. The use of the crystal and diode in the frequency selective construction 42 provides this network with a failsafe quality, always resulting in a no-output condition under failure. Damage or failure of the crystal detunes the circuit so that it cannot pass a signal. The diode is unable to fail in a HIGH mode. Even certain very unlikely forms of failure, such as shorting over an entire stage would cause the output to rise to a higher frequency than that normally obtained. The filter will not accept this signal and would therefore produce no output. Because the frequency rises to a higher level there are no problems with harmonic content in the filter.

The frequency division network 52, FIG. 4, which is a shift register-ring counter configuration of flip-flops, may be substituted for the binary counter configuration in circuit 10. The three flip-flop stages 54, 56 and 58 are connected in a shift register configuration. The 1 the 0 outputs of the first flip-flop is connected directly to the S and C inputs of the second flip-flop. Similarly the 1 and 0 outputs of the second flip-flop are fed to the S and C inputs of the third. The outputs of the third flip-flop are cross-coupled and fed back to the C and S inputs of the first. The input frequency $FREQ_{in}$ is now supplied to the T input of all the flip-flops. If the A, B and C terminals all have a 6 volt TRUE signal applied thereto, the output frequency will be one-sixth that of the $FREQ_{in}$. This frequency division occurs as follows. If the output of the first stage is already a ONE, then the first clock pulse will move this ONE to the second stage, the second clock pulse will shift the ONE to the third stage. The next or third clock pulse will leave the ONE in the third stage, but shift a ZERO into the first. The fourth and fifth clock pulse will move the ZERO through to third stage which is the original condition. The network has divided the input by six.

Any failure mode here causes the output frequency to drop to ZERO or to rise to one half the input frequency. The output is detected the same as in FIG. 1, except that the frequency selective circuit is for detecting $FREQ_{in}$ divided by six. The advantage of this system is that the input frequency is only divided by six and not eight as in the previous example. Therefore, if a large number of inputs are desired on one gate, the clock frequency need not be excessively high to produce a usable output frequency.

Features of this invention, in addition to its failsafe quality, including the following. Gate circuit 10 has low power requirements, in the order of 4 milliwatts per flip-flop stage, or a total requirement of the order of 20 milliwatts for the embodiments illustrated. It can be built out of easily obtainable and inexpensive, prefabricated transistorized flip-flop modules. The use of transistor modular construction results in the compact "logic card" type packaging.

The present invention has been described with a certain degree of particularity. However, it should be understood that various modifications and changes may be made in the arrangement and operation of the individual parts without departing from the scope and spirit of the invention.

What is claimed is:

1. For use in combination with a logic organization employing a logic information signal which is alternatively of TRUE and UNTRUE states, a failsafe circuit for detecting simultaneous presence of a TRUE signal at two or more logic signal inputs, comprising:

a sequence of two or more serially connected flip-flop stages operatively interconnected to form a pulse frequency division network of the type employing a mode of operation involving propagation of state changes through the sequence of stages, said frequency division network being operative to receive a pulse frequency at its input and to produce at its output the pulse frequency divided by a factor of N, where N is an integer equal to the number of flip-flop stages, each of the flip-flop stages of the sequence being of the master-slave type construction which includes an arrangement of two active amplification and switching devices which are regeneratively cross-coupled by direct current cross-coupling paths, each of the flip-flop stages of the sequence being operative to change state only during application of a predetermined operating potential to the arrangement of two active devices, a corresponding sequence of two or more logic signal input networks, the logic signal input networks each including a circuit means for adapting said TRUE signal as said predetermined operating potential and for individually applying same to the active device arrangement of the corresponding flip-flop stage of the sequence of flip-flop stages, a signal source means for pulsing the pulse frequency division network with a signal of predetermined pulse frequency, $FREQ_{in}$, said predetermined pulse frequency being substantially higher than the maximum normal rate of change of logic state of the signals to be applied to the logic signal input networks, and frequency selective circuit means for detecting a signal frequency, $FREQ_{in}$ N, at the output of the last flip-flop stage and for producing an output signal representing a TRUE output state of the psuedo-AND gate in response thereto.

2. A failsafe circuit in accordance with claim 1, with said flip-flop stages being operatively interconnected to form a binary counter network with the periodic pulse signal applied to the CLOCK input of the first flip-flop stage.

3. A failsafe circuit in accordance with claim 1, with said flip-flop stages being operatively interconnected to form a shift register-ring counter network with the periodic pulse signal applied simultaneously to the CLOCK inputs of all of the flip-flop stages.

4. A failsafe circuit in accordance with claim 1, with said frequency selective circuit means comprising a frequency selective crystal device and a rectifier means connected thereacross.

5. A logic control system responsive to the occurrence of a predetermined number of events, the combination of:

signal means for providing a signal of a predetermined frequency;

a frequency divider means of n stages, where n is an integer, for providing an output signal at a signal output only in response to the application of said signal of a predetermined frequency from said signal means to the signal input of said frequency divider means in conjunction with respective control signals, related to said predetermined number of events, being concurrently applied to the respective control inputs of said n stages, a given stage of said frequency divider means being inoperative prior to the occurrence of a given one of said predetermined events, and being made operative in response to the occurrence of said given one of said predetermined events, and means for providing said respective control signals to the respective control inputs of said n stages, with each control signal being provided in accordance with the occurrence of one of said predetermined events.

6. A logic control system responsive to the occurrence of n predetermined events, where n is an integer, the combination of:

signal means for providing a signal of a predetermined frequency;

a frequency divider means of n stages, a given stage of said frequency divider means being inoperative prior to the occurrence of one of said n predetermined events and being made operative in response to a respective control signal being provided to the control input of said given stage, in response to the occurrence of said one of said n predetermined events, for providing an output signal at the signal output of said frequency divider means in response to the application of said signal of a predetermined frequency from said signal means to the signal input of said frequency divider means in conjunction with each of said n stages being made simultaneously operative; and means for providing said respective control signals to the respective control inputs of said n stages, with each of said respective control signals being provided in accordance with the occurrence of one of said n predetermined events.

7. A logic control system responsive to the occurrence of n predetermined events, where n is an integer, the combination of:

signal means for providing a signal of a predetermined frequency;

a frequency divider means of n stages, where n is an integer related to said n predetermined events, with each stage having a control input to which operating potential is applied upon the occurrence of one of said n predetermined events for making the stage operative, a given stage being inoperative prior to the occurrence of said one event, for providing an output signal of a predetermined frequency at the output of said frequency divider means in response to the application of said signal of a predetermined frequency to the input of said frequency divider means concurrent with each of said n stages being made operative; and means for applying operating potential to the control input of a given stage for making said given stage operative in accordance with the occurrence of one of said n predetermined events.

8. The combination claimed in claim 7 including means responsive to the production of said output signal at said predetermined frequency for providing a control signal.

9. In a train control system responsive to the occurrence of n predetermined events, where n is an integer, for providing a train control signal, the combination comprising:

signal means for providing a signal of a predetermined frequency;

a frequency divider means of n stages, where n is an integer related to said n predetermined events, with each stage having a control input to which operating potential is applied upon the occurrence of one of said n predetermined events for making the stage operative, the stage being inoperative prior to the occurrence of said one event, with an output signal of a predetermined frequency being produced at the output of said frequency divider means in response to the application of said signal of a predetermined frequency from said signal means to the input of said divider concurrent with each of said *n* stages being made operative;

means for applying operating potential to the control input of a given stage for making said given stage operative in accordance with the occurrence of one of said n predetermined events; and means for providing said train control signal in response to the production of said output signal at said predetermined frequency at the output of said frequency divider means.

* * * * *